United States Patent [19]
Harrison et al.

[11] Patent Number: 5,534,057
[45] Date of Patent: Jul. 9, 1996

[54] PROCESS FOR TREATING KAOLIN CLAYS FOR PITCH CONTROL AND THE TREATED CLAYS

[75] Inventors: John M. M. Harrison, Dry Branch; Gary M. Freeman; Carl J. Marshall, Jr., both of Macon, all of Ga.; James C. Marvin, Aiken, S.C.; Albert F. Lareau, Gray, Ga.

[73] Assignee: J. M. Huber Corporation, Edison, N.J.

[21] Appl. No.: 372,081

[22] Filed: Jan. 13, 1995

[51] Int. Cl.$^6$ .................................................. C09C 1/42
[52] U.S. Cl. ................... 106/486; 162/181.3; 162/181.5; 162/181.6; 162/181.8; 162/199; 162/DIG. 4; 501/144; 501/148
[58] Field of Search ......................... 106/486; 162/181.3, 162/181.5, 181.6, 181.8, 199, DIG. 4; 501/144, 145, 146, 147, 148

[56] References Cited

U.S. PATENT DOCUMENTS

| | | | |
|---|---|---|---|
| 3,807,702 | 3/1974 | Grillo et al. | 366/325.2 |
| 4,186,224 | 1/1980 | Grillo | 427/221 |
| 4,913,775 | 4/1990 | Langley et al. | 162/164.3 |
| 4,927,465 | 5/1990 | Hyder et al. | 106/486 |
| 4,964,955 | 10/1990 | Lamar et al. | 162/164.6 |
| 5,037,508 | 8/1991 | Hyder et al. | 162/181.2 |
| 5,368,692 | 11/1994 | Derrick | 162/181.8 |
| 5,368,694 | 11/1994 | Rohlf et al. | 162/199 |

OTHER PUBLICATIONS

Gordon J. Gill, "CONTROLLING PITCH DEPOSITS IN PULP MILLS WITH TALC", Pulp & Paper, (Aug. 1974), pp. 104–107.

Albert R. Kiser, "THE USE OF TALC TO CONTROL PITCH DEPOSITION", TAPPI Conference Paper: Alkaline Pulping Test, (1976), p. 133.

Lawrence H. Allen, "MECHANISMS AND CONTROL OF PITCH DEPOSITION IN NEWSPRINT MILLS", TAPPI, (Feb. 1980,) vol. 63, No. 2, pp. 81–87.

Chandrashekar S. Shetty et al., "A LIKELY MECHANISM FOR PITCH DEPOSITION CONTROL", TAPPI Journal, vol. 77, No. 10, pp. 91–96. (Oct. 1994).

Ella W. Steyn, "PITCH AND STICKIES CONTROL", TAPPSA '86, 3rd Int'l. Conf., (Apr./May 1986,) p.18.

Fred P. Lodzinski, "AN IMPROVED TECHNIQUE FOR ESTIMATING DEPOSITABLE PITCH", TAPPI, vol. 63, No. 11, (Nov. 1980) pp. 163–164.

D. A. Hughes, Sr., "A METHOD FOR DETERMINING THE PITCH ADSORPTION CHARACTERISTICS OF MINERAL POWDERS", TAPPI, vol. 60, No. 7, (Jul. 1977), pp. 144–146.

Busperse 251 Technical Bulletin, "PRODUCTS FOR THE PULP AND PAPER INDUSTRY", Buchman Chemical Col., Bul. No. 1–A–04. No Date Avail.

"DETERMINING PITCH ABSORPTION CHARACTERISTICS OF MINERAL POWDERS", Huber Lab Method and Data, 3 pages. No date Avail.

*Primary Examiner*—David Brunsman
*Attorney, Agent, or Firm*—Lowe, Price, LeBlanc & Becker

[57] ABSTRACT

A process for beneficiating crude kaolin clay under defined conditions with a sufficient amount and concentration of aluminum chlorhydrate (0.5 to about 5.0 active wt. %) to improve the clay's ability to adsorb pitch during the process of making paper. The invention also relates to the treated clay and to the use of the clay in a papermaking process to absorb pitch and/or anionic trash.

27 Claims, 6 Drawing Sheets

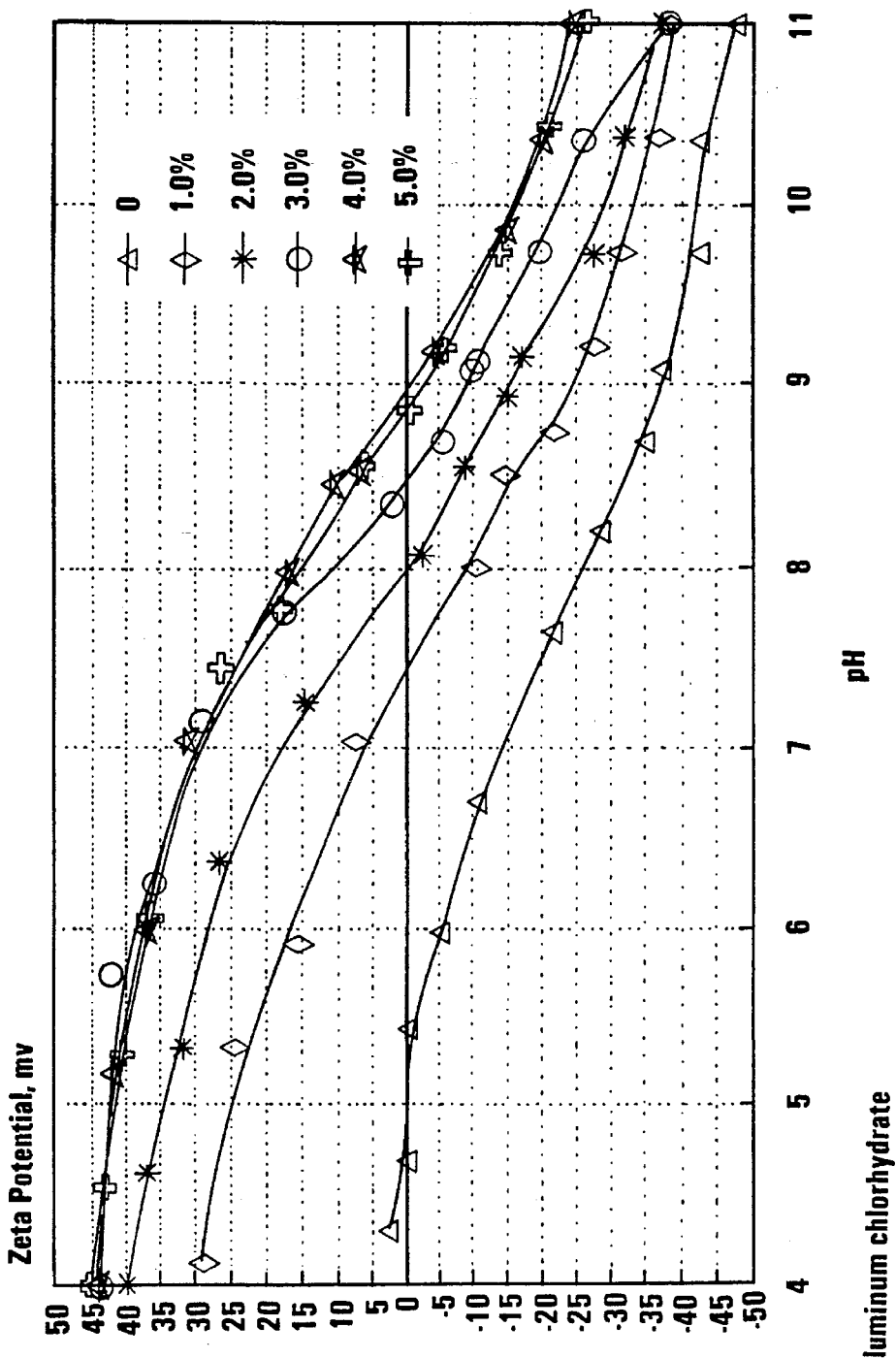

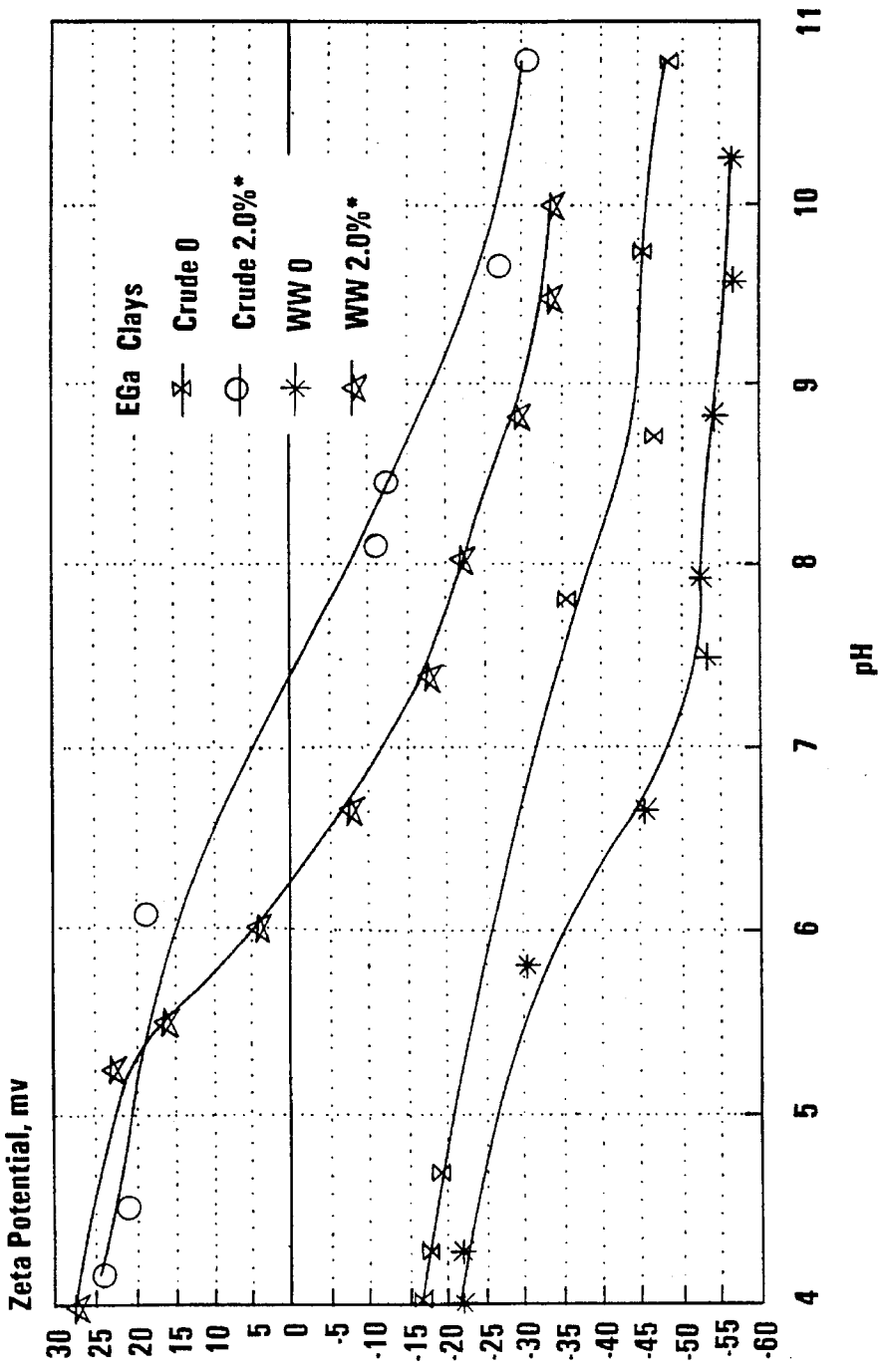

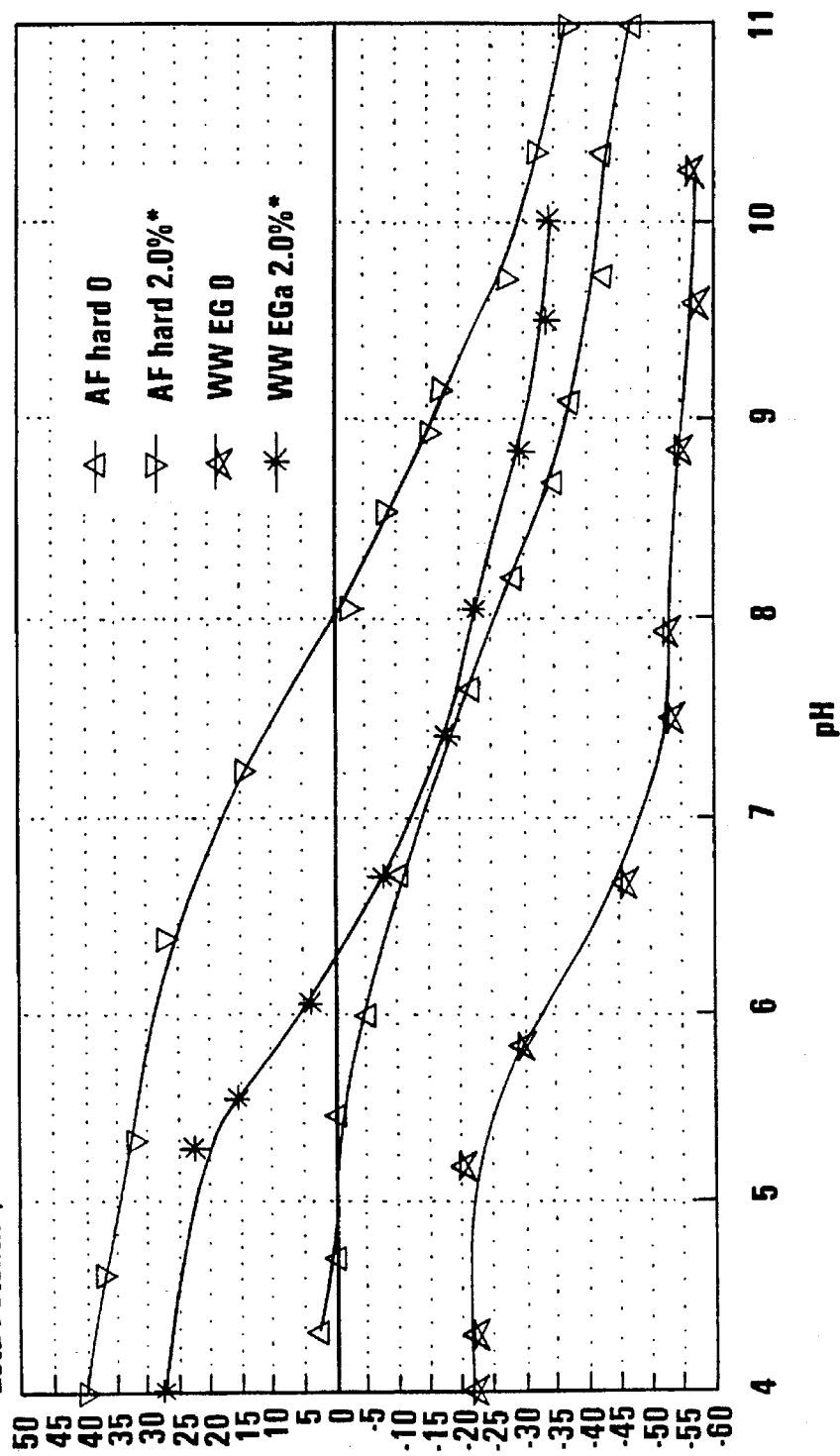

5,534,057

1

PROCESS FOR TREATING KAOLIN CLAYS FOR PITCH CONTROL AND THE TREATED CLAYS

FIELD OF THE INVENTION

This invention relates to an improved method of treating or beneficiating kaolin clay to improve its ability to adsorb pitch and thus control the deposition of pitch during the process of making paper. The invention also involves the chemically treated clay, as well as the utilization of said treated clay to control pitch deposition or to remove anionic trash during the process of making paper, and a process for preparation of the treated clay.

BACKGROUND OF THE INVENTION

As explained in commonly assigned U.S. Pat. No. 4,927,465 to Hyder et al., in the operation of a pulp mill in the production of paper, one of the recurring problems is control of the pitch which is deposited during operation. Pitch is the sticky, resinous substance of varying composition which originates from the extractive fraction of wood in the papermaking process. Pitch is reported to be composed of fatty acids and rosin acids and their corresponding calcium, magnesium, and sodium salts. The pitch exists in its dispersed state until chemical changes in the paper furnish cause it to agglomerate and deposit on screens, belts or other paper machine surfaces. This results in holes or breaks in the sheet and expensive down time for clean-ups. It is reported that the paper industry loses thirty million dollars annually because of lost production caused by pitch problems. Though various measures have been taken to combat these problems, by far the most effective measure taken to the present date is the use of talc to adsorb the pitch, thereby preventing agglomeration and subsequent deposition. The talc pitch complex is retained as part of the final product so that no difficulty arises from its presence. There is discussion of this problem by Gill in "Pulp Processing", Volume 48, No. 9 (August, 1974) page 104. In addition, there is disclosed in *Tappi Conference Paper: Alkaline Pulping Test*, 1976, a publication by Albert R. Kaiser of St. Regis Paper Company on "The Use of Talc to Control Pitch Deposition", pages 133–134.

Use of talc as a pitch deposition control agent, however, is expensive because of the price of talc, so there is a need to increase efficiency of such pitch deposition controls, while at the same time increasing cost savings in operation of the process.

SUMMARY OF THE INVENTION

It is an object of the present invention to provide an agent to control pitch in the papermaking process by treating crude kaolin clay with aluminum chlorhydrate in the absence of any other processing chemical, and by using specified process parameters to obtain results equivalent to those in conventional papermaking processes, with cost performance benefits greater than what has been possible previously.

The aluminum chlorhydrate treated clays of the invention act to control pitch by adsorbing the fatty and rosin acids comprising pitch residues via electrostatic attraction. The fatty and rosin acids contain negatively charged carboxylate groups while the aluminum chlorhydrate treated-clays exhibit cationic charge properties. This ionic reaction produces a clay-pitch complex that ultimately becomes a filler pigment in the sheet. The cationic charge properties of these treated clays is therefore of paramount importance to their ability to adsorb pitch in wet-end paper systems. The magnitude of their positive surface potential and the point of zero charge are both important charge characteristics for the products of this invention.

The treatment chemical, aluminum chlorhydrate, has the active oxide formula $Al_2(OH)_5Cl \cdot 2H_2O$, is sold commercially under the name Chlorhydrol® by Reheis Chemical, as Sumachlor® 50 by Summit Research Labs, and by other suppliers. As available commercially, Chlorhydrol® is a clear, colorless 50% active solution and is preferably used in that form in this invention, although other physical forms of the chemical agent may also be used to treat the kaolin. By referring to lower process costs, it is meant that the pitch control clay is equivalent in terms of control at the same chemical dosage. This process provides a more uniform surface coverage of the clay by the treating chemical, aluminum chlorhydrate. In other words, better mixing between the clay and the treating chemical is achieved.

A further object of the invention is to employ a solids/liquids mixer in which the degree of mixing is controllable in a manner independent of the clay throughput rate. The mixing technique involves use of a piece of mixing equipment which will produce a clay with equivalent pitch control without using added moisture to effect good mixing. Thus, starting with crude clay, which contains 18 to 22 wt. % moisture when mined, no additional water needs to be added during processing.

A still further object of the instant invention relates to mixing the treatment chemical with a clay in a manner compatible with other processing steps necessary to achieve other product properties. In this connection, the ultimate product has a grit specification which must be satisfied by a step or technique to remove a predetermined amount of grit present in the crude clay as mined. Grit is defined here as plus 325 mesh residue which is largely quartz. For removing the grit, it is an object herein to use a process in which the crude clay need not be degritted prior to treatment with aluminum chlorhydrate. Rather, the method is inherently capable of degritting the aluminum chlorhydrate-treated clay.

An important object of the invention is the provision of a process which will avoid the use of any processing chemicals having, or suspected of having, a negative or neutralizing effect on the aluminum chlorhydrate's ability to aid kaolin clay in its role as a pitch control agent. For example, anionic dispersants are commonly used in processing water washed clays, but ionically react with aluminum chlorhydrate and render it ineffective by neutralizing its cationic charge. The instant process however allows the aluminum chlorhydrate to independently modify surface charge without interference and thereby yield a high positive zeta potential or surface charge on the clay particles.

A further object of the invention is to provide a method to produce cationic clay products, via aluminum chlorhydrate treatment of crude kaolin clay, which have a more positive zeta potential at pH 4–5 as well as exhibiting a higher pH value at its point of zero charge than the treated clays of the prior art.

An even further object is to provide a method to produce a treated, cationic clay product having the ability to control pitch under acidic as well as under neutral or slightly alkaline wet-end paper conditions. Pitch control under neutral or slightly alkaline papermaking conditions was not provided by the treated clays of the prior art because of their negative surface charge properties at these pH's.

A still further object of the invention is to provide treated clay products of high cationic charge that are capable of removing anionic trash from the white water systems present in paper mills. Such anionic trash commonly consists of latex and other binders, that originate from coated broke in the papermaking process. The removal of this anionic trash is provided in much the same way by which the treated clays of this invention adsorb pitch.

As will become evident from an inspection of the prior art, the instant invention involves an improvement upon the combination of several U.S. patents. In U.S. Pat. No. 3,807,702 to Grillo et al., the subject matter involves apparatus denominated "a pin mixer". Conversely, the present invention concerns itself with a process, rather than just said piece of equipment. Though the pin mixer is employed in the preferred embodiment of the current invention, there are other aspects of the process which comprise the novelty of the invention. It is the combination of the pin mixer with these other aspects, such as the use of essentially undried lump crude clay, which represents the novel features of the invention. Also, there are other mixers besides the pin mixer which may be used. For example, a person skilled in the art of solids mixing would consider a paddle mixer, a Bepex Turbulizer or a ribbon blender as a suitable substitute for the pin mixer.

In U.S. Pat. No. 4,186,224 to Grillo, the inventor is concerned with a process for making certain chemically treated clays, including the utilization of a pin mixer to blend the clay with the necessary agents. However, the chemicals are hydrophobic organic materials and, therefore, require a solvent as a critical part of the process. Also, the clay must be dry to accept and mix well with the organic solvent and chemical. On the other hand, the present invention is operable with crude clay and its naturally occurring moisture, as previously indicated in the objects of the invention. Although the Grillo '224 patent relates to the use of a pin mixer in carrying out the steps of its operation, the present invention is not directed to the use of a pin mixer, per se, as the invention.

A relatively recent invention is described in U.S. Pat. No. 4,927,465 to Hyder et al. This patent concerns the use of dry clay or a clay slurry as the starting material for a chemical treatment. During the critical step of mixing the chemical with the clay, the clay is still in one of two forms, dry or slurry. On the other hand, in the invention herein, the starting clay is lump crude clay in its original undried form which is mixed with a chemical. The improvements in the product of this process reside in the control of the combined parameters of moisture, degree of mixing, chemical dosage, chemical concentration, crude clay selection and clay lump size. These process improvements result in a treated clay product having better performance properties than that to which the claims in the noted Hyder et al. patent are directed. In particular, treated clay products having increased positive surface charge are produced by the process of the instant invention. This surface charge is measured in millivolts as a zeta potential, which is the electrical potential that exists across the interface or surface of all solids and liquids.

A divisional patent of the above, U.S. Pat. No. 5,037,508, Hyder et al. claims a method for adsorbing pitch in a papermaking process using an aluminum chlorhydrate-treated kaolin clay or a hydrotalcite-treated kaolin clay. The present invention, as previously explained, applies to using undried lump crude clay as the starting material, whereas the referenced patent covers using dry or slurried clay.

In the preferred embodiments of the two Hyder et al. patents, a minimum amount of anionic dispersant (0.1–0.15% Calgon™) is added to the clay prior to the addition of the aluminum chlorhydrate. The present invention, to the contrary, requires no dispersant. In addition, the claims in the two Hyder et al. patents limit the amount of aluminum chlorhydrate to the range of between 0.5 to 1.5 active wt. %. In the invention at hand, the method of processing the clay allows a broader useful range of aluminum chlorhydrate treatment. The examples support the indicated broader range, which is reflected in the claims.

BRIEF DESCRIPTION OF DRAWINGS

Reference is now made to the drawings accompanying the application wherein:

FIG. 1 shows the zeta potential in millivolts (mv) plotted against pH for a very dilute slurry of an airfloat, fine particle, hard clay having an aluminum chlorhydrate active treatment level of 0–5%;

FIG. 2C shows East Georgia fine particle clay, as both crude and waterwashed examples, with zero and with 2.0% active aluminum chlorhydrate treatment;

FIG. 3 depicts a comparison of the zeta potentials of the airfloat, South Carolina, hard clay (AF hard) and the waterwashed, fine particle, East Georgia clay (WW EGa) for both untreated and 2.0% active aluminum chlorhydrate treated versions.

DESCRIPTION OF PREFERRED EMBODIMENTS

Figure 2A:
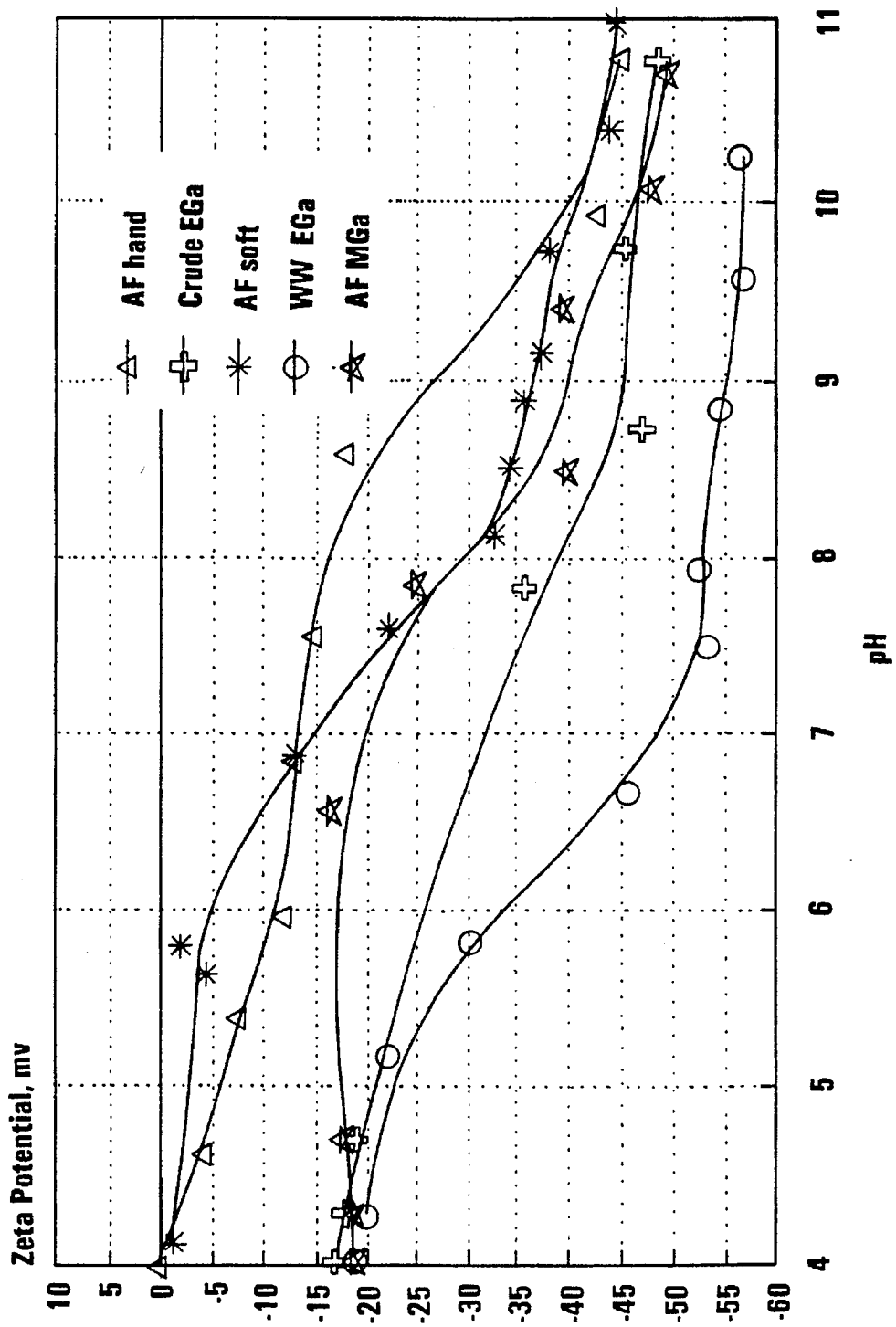
FIG. 2A shows the zeta potential in millivolts (mv) for several untreated clays as a means of defining the type of clay feedstocks that are most useful in our process for obtaining an effective pitch control product.

The present invention concerns 1) a method of improving the chemical modification of kaolin clay; 2) the beneficiated clay; 3) the employment of said modified clay as an agent for controlling pitch or removing anionic trash in the papermaking industry; and 4) a process for preparation of the modified clay. Although kaolin clay has previously been improved by reaction with a double bond hydroxide of magnesium and aluminum (Hyder et al. '465), and has been modified with either aluminum chlorhydrate (Chlorhydrol) or hydrotalcite, the invention herein provides an improved modified kaolin as compared with those previously disclosed.

Throughout the southeastern part of the United States, kaolin clays are mined and processed for use in various industries. The particular clay is identified by the region from which it is obtained, such as Middle Georgia cretaceous clays and East Georgia tertiary clays. The present invention relates to improving the pitch control properties of all such clays.

More specifically, the process for preparing an improved kaolin clay for pitch control in the present invention involves treating crude fine particle kaolin clay in lump form, with a moisture level such that the mineral can be transported by belt and/or screw conveyors. The lump clay is broken into small particles by means of a mechanical comminute or pulverization mill. The so pulverized mineral is conveyed into a mixer in a controlled manner simultaneously with the addition of the treatment chemical, aluminum chlorhydrate, to said mixer. It is then thoroughly mixed to blend the clay with the treatment chemical so as to obtain uniform surface modification.

The treated mineral is further dried, if necessary, to a moisture level suitable for shipping and/or to achieve product specifications. The dried treated mineral is further pulverized to a controlled degree of fineness, undesirable coarse particles being removed from the dried and pulverized mineral using an air classification type of separation. A controlled level of coarse particles are permitted to remain in the product.

The process is preferably conducted on a continuous basis, starting with lump crude mineral. Thus, the rate at which the mineral and chemicals enter the mixing equipment is essentially the same as that at which the treated mineral exits from the mixer. When the lump mineral requires partial drying, this may be accomplished by using drying equipment, such as a rotary dryer. For mechanically pulverizing or comminuting the lump mineral, a hammermill or a chain mill is the apparatus of choice. On the other hand, for mixing the kaolin with the treatment chemical, a pin mixer is preferred, although, as previously mentioned, a paddle mixer, a Bepex Turbulizer, or a ribbon blender may also be used. To convey the pulverized mineral to the mixer in a controlled manner, a loss-in-weight feeder or a weigh belt feeder is generally employed.

The concentration of moisture in the lump crude material is controlled by using an in-line moisture instrument, installed at a point between the pulverizer and the mixer, as described above. The treated material may be further dried by utilizing a rotary dryer and/or a flash dryer. In a particularly preferred embodiment, the drying equipment, the pulverization equipment and the air classification equipment are all combined into a single piece of apparatus, such as a Raymond Roller Mill or a Raymond IMP Mill.

The selected starting mineral for the process is kaolin clay in an as-mined, crude form. It is desirable that this clay feed have a TAPPI brightness of at least 70% and more preferably above 80%, since the resulting clay-pitch complex will ultimately become part of the filled sheet and can affect paper brightness. Said clay is preferably partially dried to a moisture level between about 12 and 18 wt. %. In addition, this crude clay preferably exhibits a zeta potential equal to or more positive than −10 mv at pH 5.

As noted above, the treating chemical is a waterbased solution of aluminum chlorhydrate. The solution employed contains above about 25 wt. % and preferably is about 50 wt. % of aluminum chlorhydrate, the concentration in the commercial product, Chlorhydrol®. The treating chemical is added to the kaolin by means of a metering pump in an amount equal to between about 0.5 and 5 active wt. % of said clay on a dry basis, preferably between about 2.0 and 5.0 active wt. %.

EXAMPLE 1

In FIG. 1, there is shown the zeta potential in millivolts against pH for a very dilute slurry of an airfloat, fine particle, hard clay, having selected treatment levels of 0 to 5 active wt. % aluminum chlorhydrate. The zeta potential measurements of an extremely dilute aqueous clay slurry were made as a function of pH on a Malvern Zetasizer 4 instrument that determines particle surface charge by electrophoretic mobility.

The varying levels of aluminum chlorhydrate treatment on the airfloat, hard clay of FIG. 1, lead to the following conclusions:

A. It is preferred that the treated clay product have a +30 mv or greater potential at pH 4 for purposes of pitch control. Cationic potential equates to pitch control capability as described in the Hyder and Kunkle patent (U.S. Pat. No. 5,037,508).

B. It is also preferred that the treated product have a point of zero charge that occurs at pH 7.5 or above. The higher the pH value for zero charge, the greater the clay's potential for pitch control in neutral or alkaline papermaking systems.

C. The typical desirable aluminum chlorhydrate treatment level is about 2.5 active wt. % for resulting pitch control in acid wet end paper systems. The useful level is 0.5–5.0 active wt. %; the most preferred level is 2.0–3.0 active wt. %.

D. It is obvious from the point of zero charge observed in FIG. 1 that a higher aluminum chlorhydrate treatment is required for alkaline papermaking pitch control. The treatment level should be 3.0–5.0 active wt. % for neutral or alkaline papermaking wet end systems.

Clays that can be used as starting materials to produce a pitch control product, as shown in FIG. 2A, are identified as follows:

AF hard—airfloat, hard (fine particle) from South Carolina;

Crude EGa—crude, fine particle clay from East Georgia;

AF soft—airfloat medium particle clay from South Carolina;

WW EGa—waterwashed (processed), fine particle clay from East Georgia; and

AF MGa—airfloat, medium particle clay from Middle Georgia.

Defining the preferred clay feedstocks on the basis of their surface charge properties for producing the pitch control product leads to the following conclusions for FIG. 2A.

A. In general, airfloat and unprocessed crude clays are better feedstocks than chemically processed clays (i.e., no anionic dispersants).

B. For the airfloat clays and unprocessed crude clays, the most preferred ones at a pH of 5 have a zeta potential equal to or more positive than −10 mv.

C. The waterwashed clay had the most negative zeta potential because of the use of an anionic dispersant during its processing. This extra anionic charge will partially negate the effectiveness of subsequent aluminum chlorhydrate treatment.

The clays presented in FIG. 2A were then surface treated with 2.0% active aluminum chlorhydrate for zeta potential measurements. All the clays except for the treated in crude form using a bench scale Hobart® mixer waterwashed East Georgia clay WW EGa were chemically treated in crude form using a bench scale Hobart® mixer by a procedure where the aluminum chlorhydrate solution was added to the crude lump clay (having 15 to 20% moisture content) while the clay was being well mixed. After mixing, the wet clay was dried and pulverized. In contrast, the aluminum chlorhydrate solution was added to the waterwashed East Georgia clay in slurry form (which contained Calgon dispersant) and the slurry subsequently spray dried in accordance with the teachings of Hyder et al.

Figure 2B:
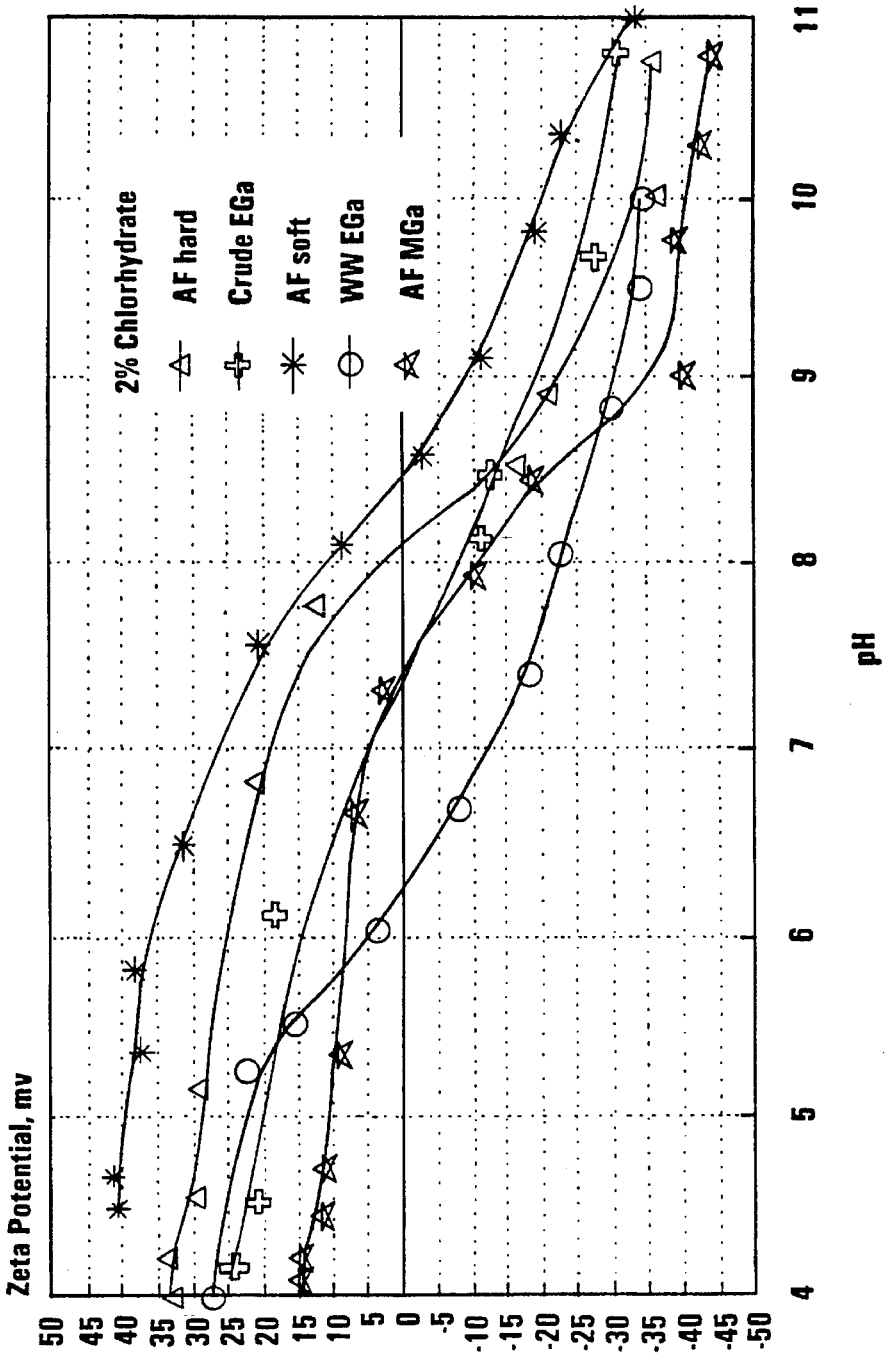
FIG. 2B shows the zeta potential in millivolts (mv) for the same clays of FIG. 2A that have been surface treated with 2.0% active aluminum chlorhydrate.

The zeta potential of these clays after surface treatment with 2.0 active wt. % aluminum chlorhydrate are shown in FIG. 2B. The zeta potentials of the treated clays show the same relative charge profiles as the untreated clays of FIG. 2A. Those untreated clays with the higher potentials also have the higher zeta potentials when treated with aluminum chlorhydrate. The treated airfloat and crude clays are cationic over a considerably wider pH range than the treated waterwashed clay.

With respect to the fine particle East Georgia clay shown in FIG. 2C, this involves both crude and waterwashed examples with zero and 2.0 active wt. % aluminum chlorhydrate treatment. Both the crude samples, untreated and treated, have much higher zeta potentials over most of the pH range than do their waterwashed clay counterparts. These charge differences can be attributed to the addition of process chemicals, most notably anionic dispersants in the waterwashed process. A comparison of the zeta potentials of the airfloat, South Carolina, hard clay and the waterwashed fine particle East Georgia clay for both untreated and 2.0 active wt. % aluminum chlorhydrate-treated versions are compared in FIG. 3. The airfloat clay shows a considerable cationic potential advantage over the waterwashed clay in both the untreated and treated versions. As the treated waterwashed clay represents the preferred product of the Hyder/Kunkle patent, it is obvious to one skilled in the art that the feedstock clay and the processing described herein lend themselves to a more desirable pitch control product than that previously obtained.

EXAMPLE 2

Figure 4:
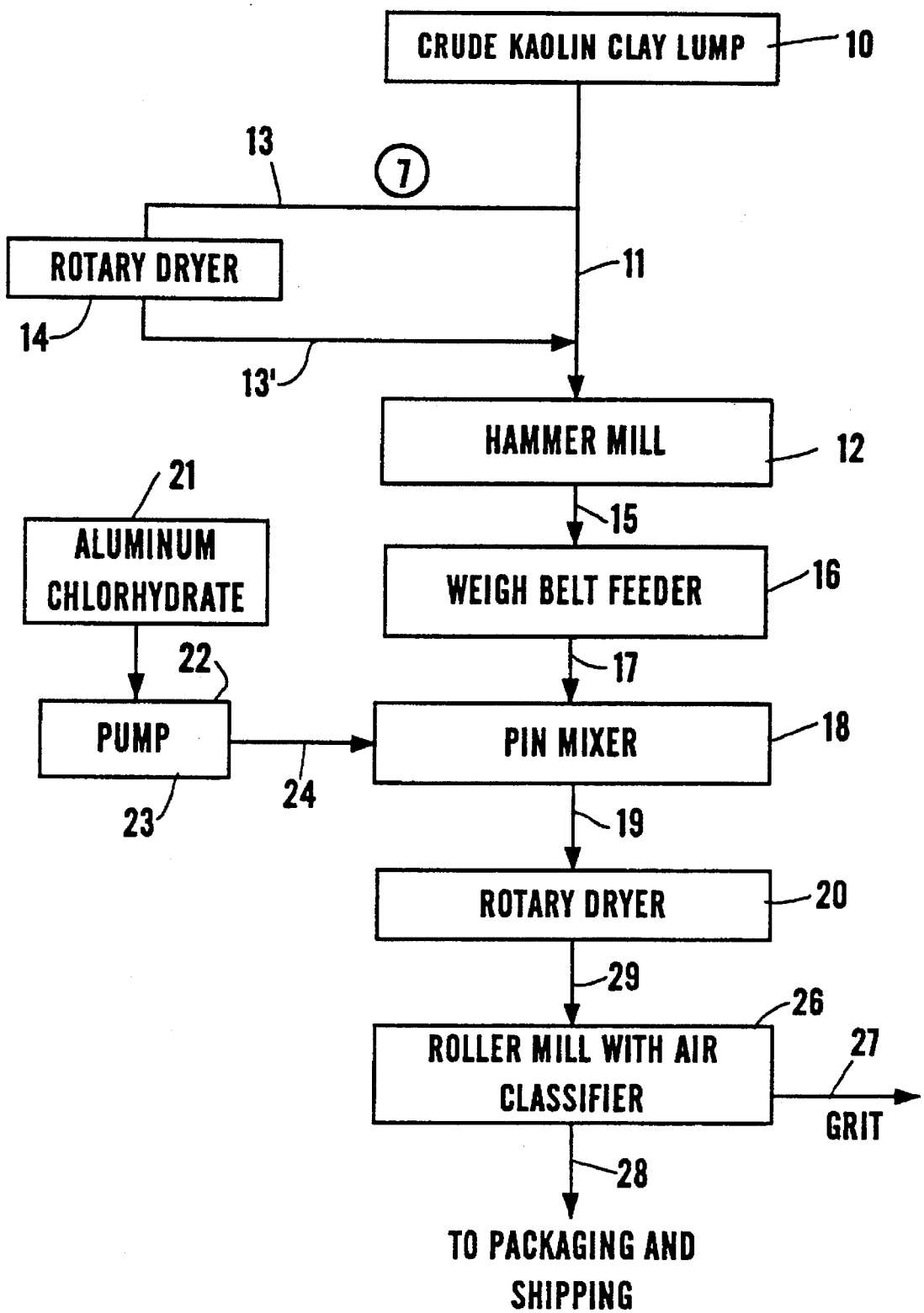
FIG. 4 is a flow sheet of a preferred process for preparation of a treated clay of the invention.

Reference is made to FIG. 4 and a method for preparation of the treated clay of the invention.

In the method of FIG. 4, crude kaolin lump clay from source 10, containing 20 TPH clay, wet, 21 wt. % water, and 2.5 wt. % grit, is passed by line 11 to be comminuted into small particles by a mechanical comminuter or pulverization mill such as hammer mill 12. Prior to introduction into hammer mill 12, the clay feed is dried in rotary dryer 14 via lines 13 and 13' so that the clay feed to hammermill 12 contains about 15 wt. % water. The pulverized mineral, now containing clay lumps of ⅜ inch or smaller diameter, is passed by line 15 for weighing in weigh belt feeder 16 and then conveyed into pin mixer 18 in a controlled manner simultaneously with the addition of the treatment chemical, aluminum chlorhydrate. Aluminum chlorhydrate from source 21 is passed by line 22 to pump 23 and then pumped by line 24 into mixer 18 at the rate of 21 pounds per minute of 50 wt. % active solution, specific gravity=1.34. The aluminum chlorhydrate is then thoroughly mixed and blended with the clay in pin mixer 18.

The aluminum chlorhydrate-treated clay is then partially dried to a moisture level of about 12 wt. % water, via line 19 to rotary dryer 20. The partially dried treated clay is then conveyed via line 25 to roller mill 26. There the clay is pulverized to a controlled degree of fineness, undesirable coarse particles being removed from the dried and pulverized mineral using an air classification type of separation. Grit and the like is removed at 27. A controlled level of coarse particles is permitted to remain in the product which is recovered at 28. Also within the roller mill, the treated clay is further dried to a moisture level suitable for shipping. The product recovered at 28 is a kaolin clay containing a 2.0 wt. % treatment level of aluminum chlorhydrate, and also contains about 0.5 wt. % grit and about 2.0 wt. % water.

The invention has been described with reference to certain preferred embodiments. However, the embodiments are by way of exemplification, rather than limitation. The invention is as defined in the following claims.

We claim:
1. A process for preparing a chemically treated kaolin clay having a fine particle size suitable for use as a pitch control or anionic trash removal agent in papermaking processes comprising:
   (a) providing a fine particle crude kaolin clay in lump form;
   (b) comminuting the clay to reduce the particle size of said clay;
   (c) thoroughly mixing the clay with a sufficient amount of aluminum chlorhydrate effective to increase the clay's zeta potential to a desired level for pitch control and with sufficient water to increase the moisture level of the clay to an optimum range of values;
   (d) removing moisture in excess of that suitable for shipping or necessary to comply with product specifications;
   (e) further pulverizing the treated clay to a controlled degree of fineness; and
   (f) removing undesirable coarse particles from the dried and pulverized clay employing separation means, such that a level of the coarse particles remain in the product.
2. A process according to claim 1, wherein the amount of aluminum chlorhydrate added to the clay is sufficient to increase the zeta potential of the clay to at least 5 mv.
3. The process according to claim 1, in which the clay in step (b) is comminuted in apparatus selected from the group consisting of a hammermill and a chain mill.
4. The process according to claim 1, wherein the mixing in part (c) is performed using a pin mixer.
5. The process according to claim 1, in which the starting kaolin clay is in as-mined form.
6. The process according to claim 1, in which the kaolin clay is partially dried to a moisture level between 12 and 18 wt. % prior to treatment with the aluminum chlorhydrate.
7. The process according to claim 1, in which the solution of aluminum chlorhydrate has a concentration of about 25 to 50 wt. %.
8. The process according to claim 7, in which the solution of aluminum chlorhydrate has a concentration of about 50 wt. %.
9. The process according to claim 1, in which the amount of aluminum chlorhydrate, used to treat the clay is between 0.5 and 5.0 active wt. % of the kaolin clay on a dry basis.
10. The process according to claim 1, in which the amount of aluminum chlorhydrate used to treat the clay is between 2.0 and 5.0 active wt. % of the kaolin clay on a dry basis.
11. The process according to claim 1 in which the amount of aluminum chlorhydrate used to treat the clay in between about 3.0 and 5.0 active wt. % of the kaolin clay on a dry basis.
12. The method for adsorbing pitch, anionic trash, or mixtures thereof in an acid papermaking process comprising adding to a paper furnish a component which adsorbs pitch, said component being a treated kaolin clay product produced by the process of claim 1.
13. The method of claim 12, wherein the papermaking process is conducted under neutral or alkaline conditions.
14. The process of claim 1, wherein the untreated kaolin crude clay exhibits a zeta potential equal to or more positive than −10 mv at pH 5.
15. The process of claim 1, wherein the untreated kaolin crude clay has a TAPPI brightness of at least 70%.
16. A treated kaolin clay product having a zeta potential point of zero charge occurring at or above pH 7.5.
17. A method for adsorbing pitch, anionic trash or mixtures thereof, in a papermaking process which comprises adding to a paper furnish a component which adsorbs pitch, said component being a treated kaolin clay of claim 16.

18. The treated clay product according to claim 16, wherein the clay is kaolin and has been treated with about 0.5 to 5.0 wt. % of aluminum chlorhydrate.

19. The treated kaolin clay product of claim 18 wherein the amount of aluminum chlorhydrate is between about 2.0 and 5.0 active wt. %.

20. The treated kaolin clay product of claim 19 wherein the amount of aluminum chlorhydrate is between about 3.0 and 5.0 active wt. %.

21. The treated kaolin clay product of claim 18 wherein said kaolin clay is produced by treating a dispersant free feedstock.

22. A treated kaolin clay product having a zeta potential of at least 30 mv at pH 4.

23. A method for adsorbing pitch, anionic trash, or mixtures thereof, in a papermaking process which comprises adding to a paper furnish a component which adsorbs pitch, said component being a treated kaolin clay of claim 22.

24. A treated clay product according to claim 22, wherein the clay is kaolin and has been treated with about 0.5 to 5.0 wt. % of aluminum chlorhydrate.

25. The treated kaolin clay product of claim 24 wherein the amount of aluminum chlorhydrate is between about 2.0 and 5.0 active wt. %.

26. The treated kaolin clay product of claim 25 wherein the amount of aluminum chlorhydrate is between about 3.0 and 5.0 active wt. %.

27. The treated kaolin clay product of claim 24 wherein said kaolin clay is produced by treating a dispersant free feedstock.

* * * * *